United States Patent
Miyake et al.

(10) Patent No.: US 6,943,841 B2
(45) Date of Patent: Sep. 13, 2005

(54) DIGITAL CAMERA HAVING DISPLAY CONTROLLERS AND DESIGNATING UNIT AND METHOD OF CONTROLLING OPERATION

(75) Inventors: Izumi Miyake, Asaka (JP); Kenji Kojima, Tokyo (JP); Katsumi Hirabayashi, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 615 days.

(21) Appl. No.: 09/989,408

(22) Filed: Nov. 21, 2001

(65) Prior Publication Data

US 2002/0064387 A1 May 30, 2002

(30) Foreign Application Priority Data

Nov. 29, 2000 (JP) ........................................ 2000-362016

(51) Int. Cl.⁷ .............................................. H04N 5/222
(52) U.S. Cl. ............................ 348/333.05; 348/333.02; 348/376; 386/117; 386/124
(58) Field of Search ........................ 348/333.05, 333.03, 348/333.11, 375, 333.02, 376; 386/117, 124

(56) References Cited

U.S. PATENT DOCUMENTS

| | | | | |
|---|---|---|---|---|
| 5,905,528 A | * | 5/1999 | Kodama | .................. 348/220.1 |
| 6,233,015 B1 | * | 5/2001 | Miller et al. | ............ 348/333.05 |
| 6,249,313 B1 | * | 6/2001 | Nishi | ....................... 348/231.9 |
| 6,538,698 B1 | * | 3/2003 | Anderson | .............. 348/333.05 |
| 6,563,542 B1 | * | 5/2003 | Hatakenaka et al. | ... 348/333.02 |
| 2003/0137680 A1 | * | 7/2003 | Maruoka | .................... 358/1.13 |
| 2004/0165108 A1 | * | 8/2004 | Okuda | ......................... 348/375 |

* cited by examiner

Primary Examiner—Ngoc-Yen Vu
Assistant Examiner—Hung Lam
(74) Attorney, Agent, or Firm—Birch, Stewart, Kolasch & Birch, LLP

(57) ABSTRACT

A digital still camera is provided with a freely rotatably dial. The camera has a liquid crystal display screen provided on its back and the screen displays film borders. A thumbnail image corresponding to main image data that has been recorded on a memory card is displayed in a thumbnail image border within the film borders. By rotating the dial, the film borders are moved so that a desired thumbnail image becomes enclosed by a designating frame. When the thumbnail image is enclosed by the designating frame, the main image is displayed an area. When a blank area is enclosed by the designating frame, the main image data can be recorded on the memory card. Operability is facilitated because recording, playback and designation of a frame to be played back can all be performed in accordance with rotation of the dial.

7 Claims, 10 Drawing Sheets

ENLARGED IMAGE OF THUMBNAIL IMAGE WITH APPENDED ORDER MARK

DIGITAL CAMERA HAVING DISPLAY CONTROLLERS AND DESIGNATING UNIT AND METHOD OF CONTROLLING OPERATION

BACKGROUND OF THE INVENTION

1. Field of the Invention

This invention relates to a digital camera (inclusive of a digital still camera, a digital movie camera and a portable information device having a camera function) and to a method of controlling the operation thereof.

2. Description of the Related Art

A digital still camera having a playback function is capable of being set to an imaging mode and to a playback mode. The digital camera is provided with a mode setting switch or the like in order to set the mode. The imaging mode or playback mode is set in accordance with operation of the switch, etc.

If the imaging mode is set, image data representing the image of the subject is recorded on a recording medium such as a memory card in response to depression of a shutter-release button. If the playback mode is set, the desired frame is specified by a frame-forward button or frame-back button in such a manner that the desired frame will be reproduced.

However, for a user who has become accustomed to operating a conventional camera such as a throwaway camera or a camera in which film is wound by operating a winding lever, it is comparatively troublesome to perform operations specific to a digital still camera, such as an operation for designating a playback frame in the digital still camera.

DISCLOSURE OF THE INVENTION

Accordingly, an object of the present invention is to make it easy to operate a digital camera even for a user who is accustomed to a conventional camera operation such as operation of a winding lever.

In accordance with the present invention, the foregoing object is attained by providing a digital camera comprising: a lever capable of being rotated through a prescribed angle; a mode setting unit for setting an imaging mode or a playback mode in accordance with rotation of the lever; an imaging unit for sensing the image of a subject in response to setting of the imaging mode by the mode setting unit and outputting image data representing the image of the subject; a first display controller for controlling a display unit so as to display the image of the subject represented by the image data output from the image sensing unit; a playback-frame decision unit (playback-frame decision means) for deciding a playback frame in accordance with rotation of the lever if the playback mode has been set by the mode setting unit; a playback unit for reading image data of the playback frame, which has been decided by the playback-frame decision unit, from a recording medium and subjecting the image data to playback processing; and a second display controller for controlling the display unit so as to display an image represented by image data that has been reproduced by the playback unit.

The present invention provides also an operation control method suited to the digital camera described above. Specifically, the invention provides a method of controlling operation of a digital camera comprising: setting an imaging mode or a playback mode in accordance with rotation of a lever capable of being rotated through a prescribed angle; sensing the image of a subject in response to setting of the imaging mode and obtaining image data representing the image of the subject; displaying the image of the subject represented by the image data obtained; deciding a playback frame in accordance with rotation of the lever if the playback mode has been set; reading image data of the decided playback frame from a recording medium; and displaying an image represented by image data that has been read.

In accordance with the present invention, a lever capable of rotating through a prescribed angle is provided. (Any device that can be rotated through a prescribed angle, such as a dial, will suffice irrespective of what it is called.) The imaging mode or playback mode is set in accordance with rotation of the lever.

If the imaging mode is set, the image of a subject is sensed and image data representing the image of the subject is obtained. The image of the subject represented by the image data is displayed on the display screen of a display unit. By pressing a shutter-release button, the image data representing the image of the subject sensed would be recorded on a recording medium.

If the playback mode is set, a frame to be played back is decided in accordance with rotation of the lever. Image data representing the playback frame is read from a recording medium and is subjected to prescribed playback processing. The image represented by the reproduced image data is displayed on the display screen of the display unit.

Thus, the playback mode or imaging mode can be set by operating the lever. Furthermore, a frame to be played back can be designated by operating the lever. Since operating the lever makes it possible not only to set the mode but also to specify a frame to be played back, even a user who is accustomed to operating the customary winding lever will find operation of the camera comparatively easy.

The digital camera may further comprise a reading unit for reading image data that has been recorded on the recording medium; a third display controller for controlling the display unit so as to display a thumbnail image of an image represented by the image data read by the reading unit; a fourth display controller for controlling the display unit so as to display an image of a blank frame when image data can be recorded on the recording medium; and a designating unit for designating the thumbnail image or the image of the blank frame in accordance with rotation of the lever. In this case, the mode setting unit would be set to the playback mode in response to designation of the thumbnail image and would be set to the imaging mode in response to designation of the image of the blank frame by the designating unit.

The general features of an image displayed by image data that has been recorded on a recording medium can be ascertained by observing the thumbnail image. When image data can be recorded on the recording medium (a determination unit for determining whether image data can be recorded on the recording medium would be provided as necessary), a blank frame is displayed (e.g., a blank area having only a border is displayed). By observing the blank frame, therefore, the user can tell that image data can be recorded on the recording medium. By confirming that there are no more blank frames, the user can replace the recording medium with another as necessary.

The imaging mode is set by designating a blank frame and the playback mode is set by designating a thumbnail image. This makes it comparatively simple for the user to determine which mode has been set.

The playback-frame decision unit may decide on a thumbnail image, which has been designated by the designating unit, as the image of a playback frame.

It is preferred that the third display controller display the thumbnail images on the display unit in the order of frame numbers. This makes it possible to ascertain in correspondence with which particular frame number image data can be recorded.

Preferably, the digital camera further comprises an erase button for applying an erase command; a first designating unit for designating one frame among thumbnail images of a plurality of frames in accordance with rotation of the lever; and an erase controller for erasing image data, which represents the image of the frame designated by the first designating unit, from the recording medium.

Thus, image data representing a desired image can be erased from the recording medium. Moreover, since a thumbnail image corresponding to an image to be erased is being displayed, erase processing can be executed while the content of the image to be erased is being checked.

Preferably, the digital camera further comprises a fifth display controller for displaying a thumbnail image, which corresponds to image data that has been erased by the erase controller, in a display of a blank frame. This will make it possible to verify that the image data has been erased.

The digital camera may further comprise an order button for applying an order command; a second designating unit for designating one frame among the thumbnail images of the plurality of frames in accordance with rotation of the lever; and a recording controller for recording order information, which concerns a frame that has been designated by the second designating unit, on the recording medium in response to depression of the order button.

Since order information concerning a desired frame (information indicating whether the image of this frame is to be printed, etc.) can be recorded on the recording medium, the order information can be read from the recording medium and processing such as for printing an image can be executed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
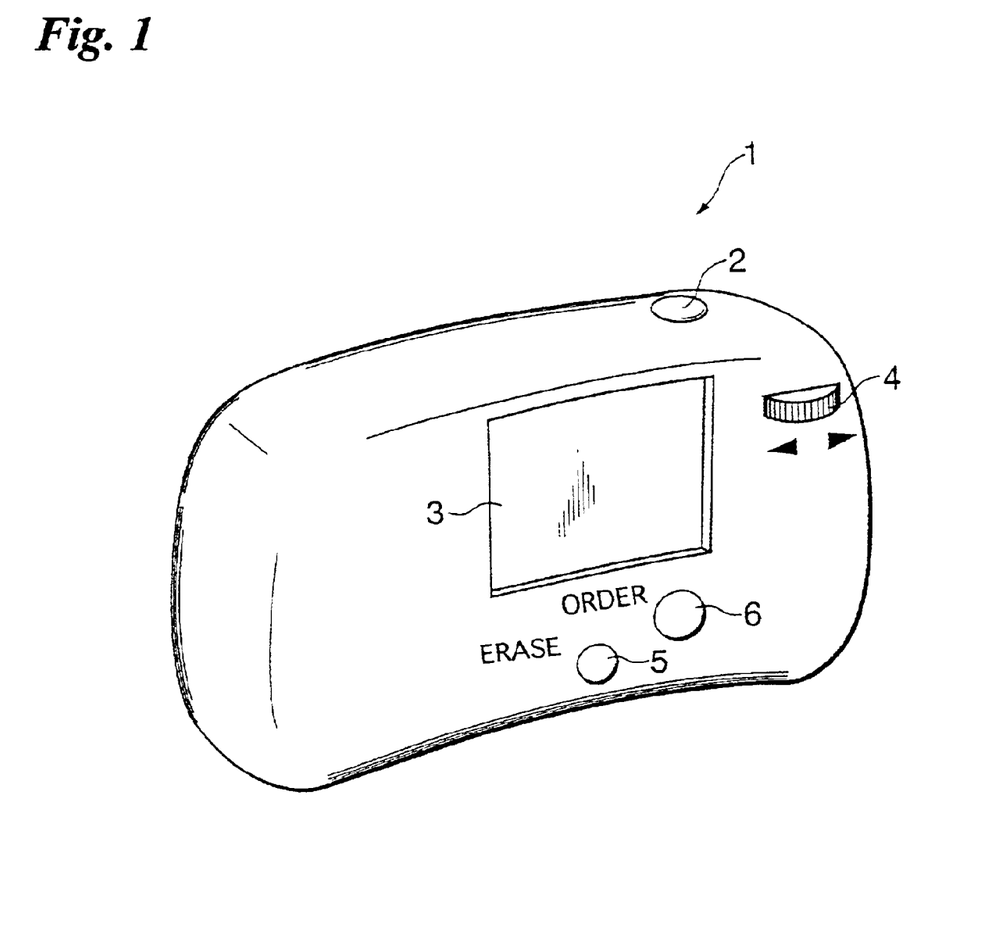
FIG. 1 is a perspective view showing a digital still camera as seen from the back side thereof.

FIG. 1 is a perspective view showing a digital still camera 1 as seen from the back side thereof according to an embodiment of the present invention.

The top of the digital still camera 1 is provided with a shutter-release button 2 on the right side when viewed from the back.

The back side of the digital still camera 1 is provided with a liquid crystal display screen 3 substantially at the center thereof. Provided to the right of the liquid crystal display screen 3 is a dial (lever) 4 that can be rotated to the left and right. Provided below the liquid crystal display screen 3 are an erase button 5 and an order button 6.

A memory-card insertion slot into which a memory card may be removably inserted is formed in one side of the digital still camera 1 (the side facing away in FIG. 1 and therefore not visible). As will be described later, the memory card inserted into the digital still camera 1 is integrated with a chargeable battery and power from the battery is supplied to the circuits of the digital still camera 1.

Furthermore, the digital still camera 1 is capable of being set to an imaging mode and playback mode. The mode is set using the dial 4. The dial 4 can also be used to designate a frame to be played back. Processing for these operations will be described later in detail.

Figure 2:
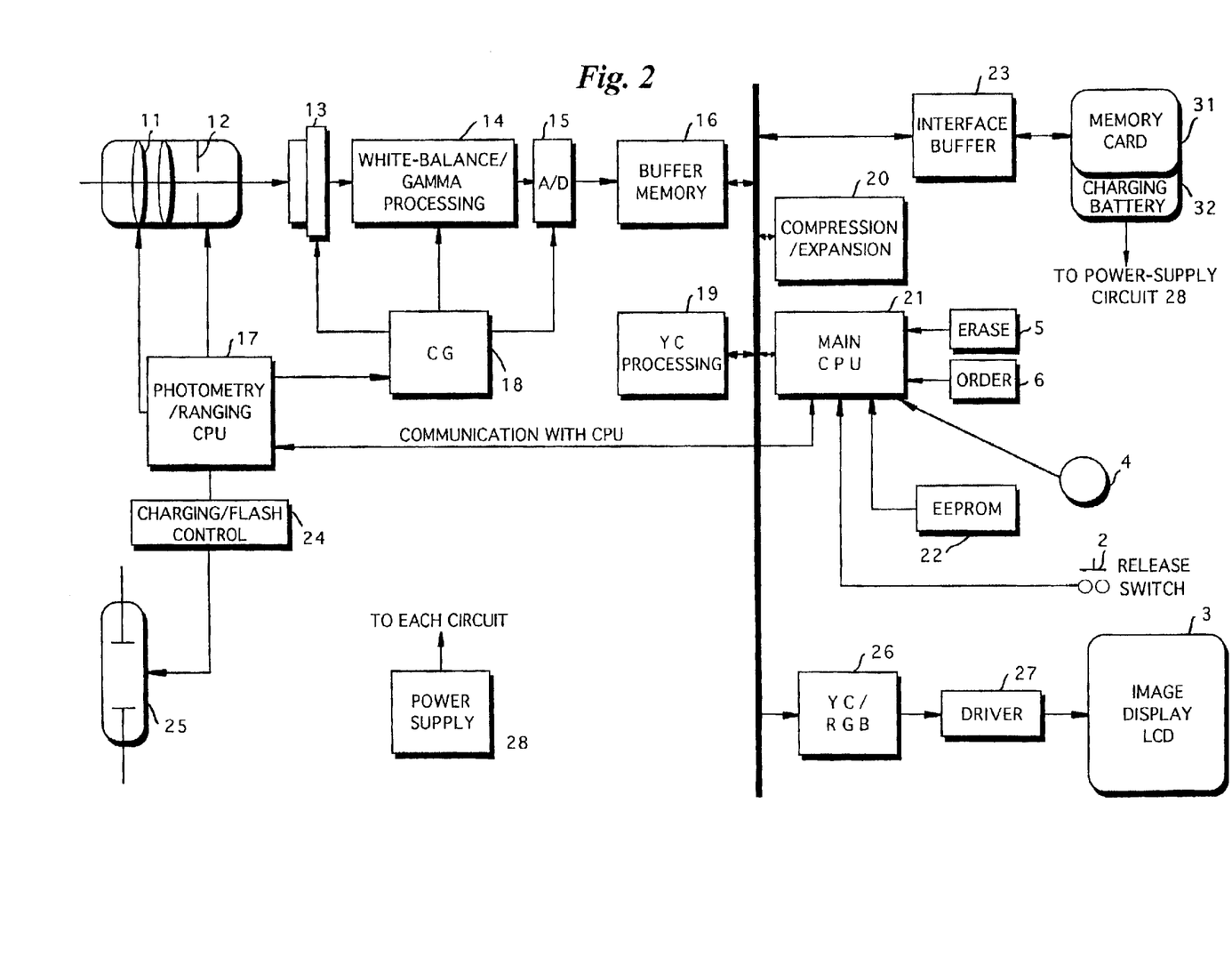
FIG. 2 is a block diagram showing the electrical construction of the digital still camera.

FIG. 2 is a block diagram illustrating the electrical construction of the digital still camera 1.

Operation of the digital still camera 1 is controlled by a main CPU 21.

A signal indicating operation of the dial 4 and signals indicating depression of the erase button 5, order button 6 and shutter-release button 2 are input to the main CPU 21.

The main CPU 21 is provided with an externally mounted EEPROM 22 storing various data.

The digital still camera 1 includes a strobe flash 25 controlled by a charging/flash control circuit 24. Whether strobe photography is performed is judged by a photometry/ranging CPU 17 based upon image data obtained by sensing the image of a subject, as will be described later. The charging/flash control circuit 24 is controlled by the photometry/ranging CPU 17 in response to a strobe-photography judgment, whereby the strobe flash 25 is fired.

As mentioned above, a memory card 31 is integrated with a chargeable battery 32. Power from the chargeable battery 32 is applied to a power-supply circuit 28 from which power is supplied to the circuits constructing the digital still camera 1.

The photometry/ranging CPU 17 controls focusing of a focusing lens 11 and the aperture of a diaphragm 12. The photometry/ranging CPU 17 further controls a clock generator (CG) 18. The clock generator 18 outputs various clock pulses that are applied to a CCD 13, a white-balance/gamma processing circuit 14 and an analog/digital conversion circuit 15, etc.

If the imaging mode is set by the dial 4, the image of a subject is formed on the photoreceptor surface of the CCD 13 by the focusing lens 11. A video signal representing the image of the subject is output from the CCD 13 and enters the white-balance/gamma processing circuit 14. The video signal is subjected to a white balance adjustment and to gamma processing by the white-balance/gamma processing circuit 14.

The video signal output from the white-balance/gamma processing circuit 14 is converted to digital image data in the analog/digital conversion circuit 15. The digital image data is applied to a driver 27 upon merely passing through a buffer memory 16 and a YC/RGB conversion circuit 26. The driver 27 applies this signal to a liquid crystal display device 3 (the same reference numeral is used to identify the liquid crystal display screen). The image of the subject obtained sensing is displayed on the display screen of the liquid crystal display device 3.

If the shutter-release button 2 is pressed in the imaging mode, the image data output from the analog/digital conversion circuit 15 in the manner described above is stored temporarily in the buffer memory 16. The image data is read out of the buffer memory 16 and a YC processing circuit 19 generates luminance data and color difference data. The generated luminance and color difference data is compressed by a compression/expansion circuit 20. The compressed luminance and color-difference data is applied to the memory card 31 via an interface buffer 23 and is recorded on the memory card.

If the playback mode is set by the dial 4, the compressed luminance data and color difference data that has been recorded on the memory card 31 is read out and is then applied to the compression/expansion circuit 20 via the interface buffer 23. The compressed luminance and color difference data is expanded by the compression/expansion circuit 20. The expanded luminance and color difference data is converted to RGB image data in the YC/RGB conversion circuit 26 and the RGB image data is applied to the driver 27. The image represented by the image data that has been recorded on the memory card 31 is displayed on the display screen of the liquid crystal display device 3.

Figure 3:
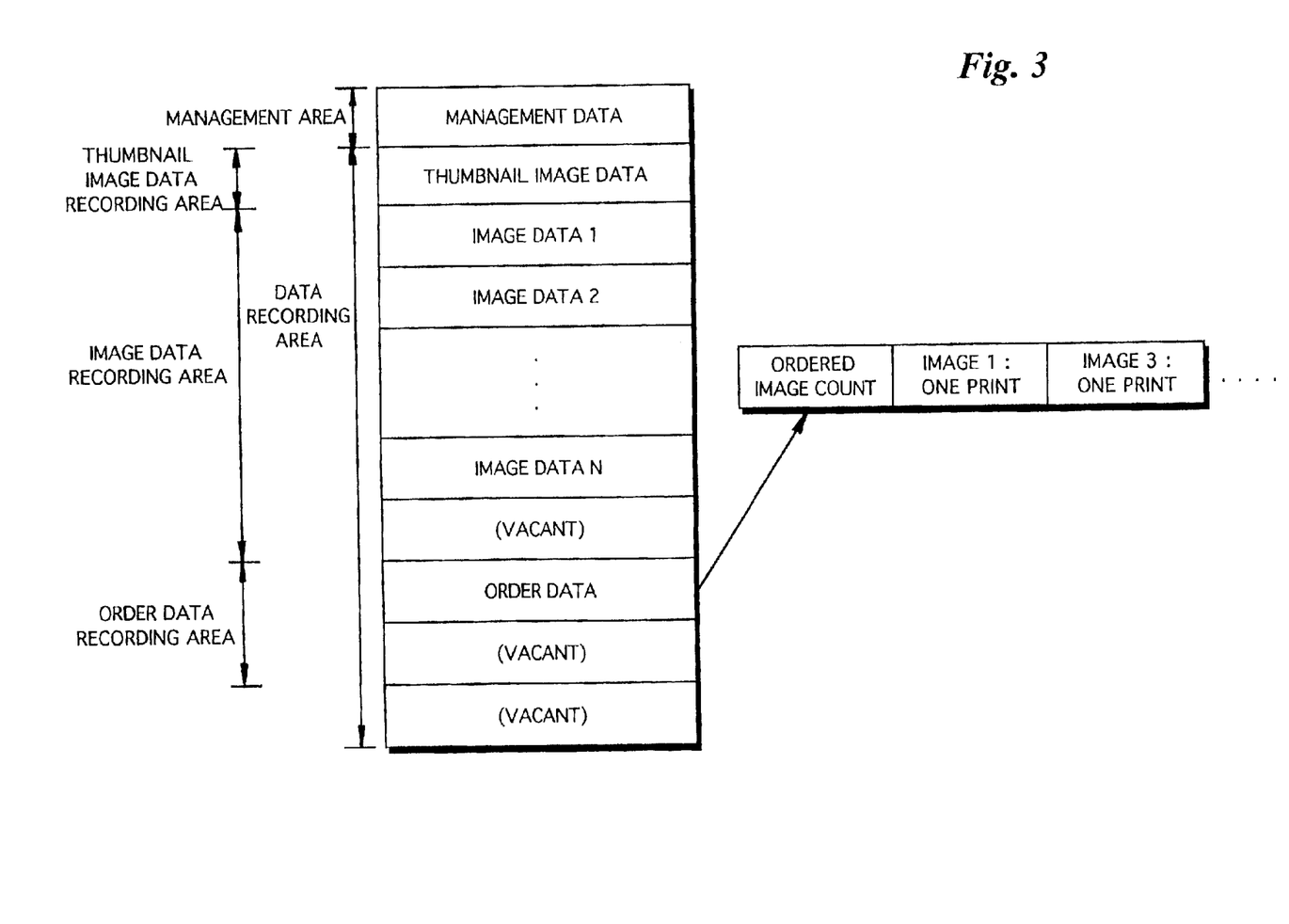
FIG. 3 illustrates the structure of data on a memory card.

FIG. 3 illustrates the data structure of the memory card 31.

The memory card 31 includes a management area and a data recording area.

Management data for managing the memory card 31 has been recorded in the management area.

The data recording area includes an area for recording thumbnail image data, an area for recording image data and an area for recording order data. Image data obtained by sensing the image of a subject (image data representing the main image rather than a thumbnail image) in the manner described above is recorded in the image data recording area. Thumbnail image data representing a thumbnail image corresponding to the main image represented by the main image data that has been recorded in the image-data recording area is recorded in the thumbnail image data recording area. Data representing image ordering information (such as the ordered-image count representing the number of prints of an image to be ordered) is recorded in the order data recording area in a form associated with each image. Thumbnail image data may of course be attached to main image data.

Figure 4A:
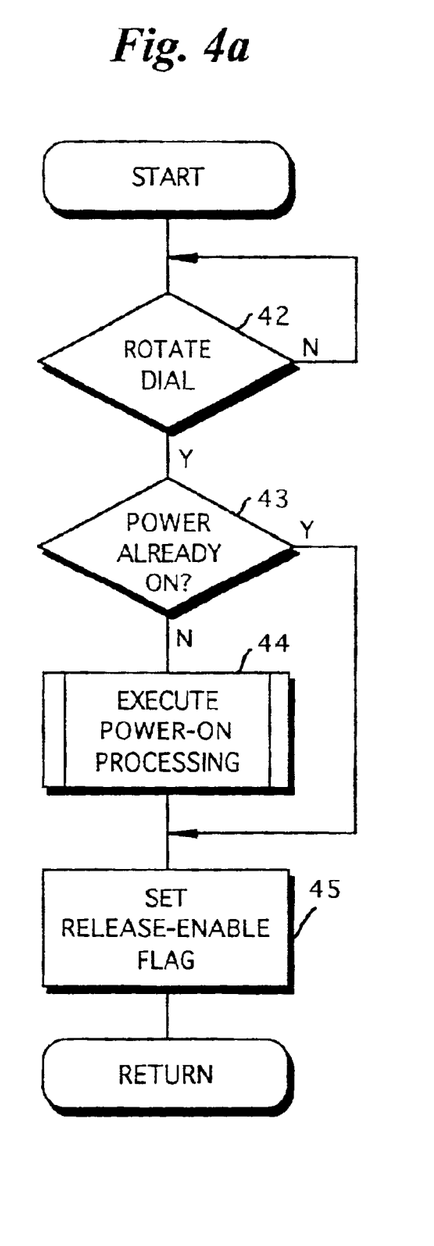
FIGS. 4a and 4b are flowcharts illustrating processing for turning on a power supply.
Figure 4B:
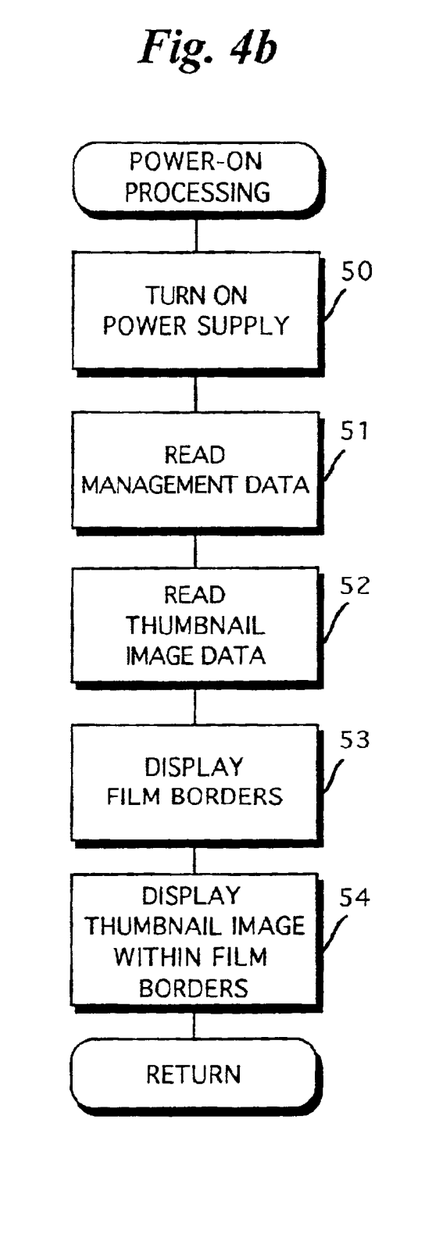

FIG. 4a is a flowchart illustrating processing for turning on the power supply of the digital still camera 1, and FIG. 4b is a subroutine of the flowchart of FIG. 4a.

In this embodiment, the power supply of the digital still camera 1 can be turned on by operating the dial 4 in the manner described above. The processing program for turning on the power supply is installed when the digital still camera 1 is shipped from the factory.

If the dial 4 of the digital still camera 1 is rotated by the user (either to the left or right) ("YES" at step 42), whether the power supply of the camera 1 is already on is checked (step 43). If the power supply of the camera 1 is off ("NO" at step 43), then the subroutine of the power-on processing is executed (step 44). If the power supply of the camera 1 is already on ("YES" at step 43), then the processing of step 44 is skipped.

A release-enable flag that allows the shutter-release button 2 to be pressed is set (step 45).

If rotation of the dial 4 is detected when the power supply is turned off, the power supply is turned on so that power is supplied to each circuit of the digital still camera 1 at step 50 in FIG. 4b.

Management data and thumbnail image data that has been recorded on the memory card 31 inserted into the digital still camera 1 is read (steps 51, 52). A strip of film with borders is displayed on the liquid crystal display screen 3 (step 53). Thumbnail images represented by thumbnail image data read from the memory card 31 are displayed within the film borders (step 54).

Figure 5:
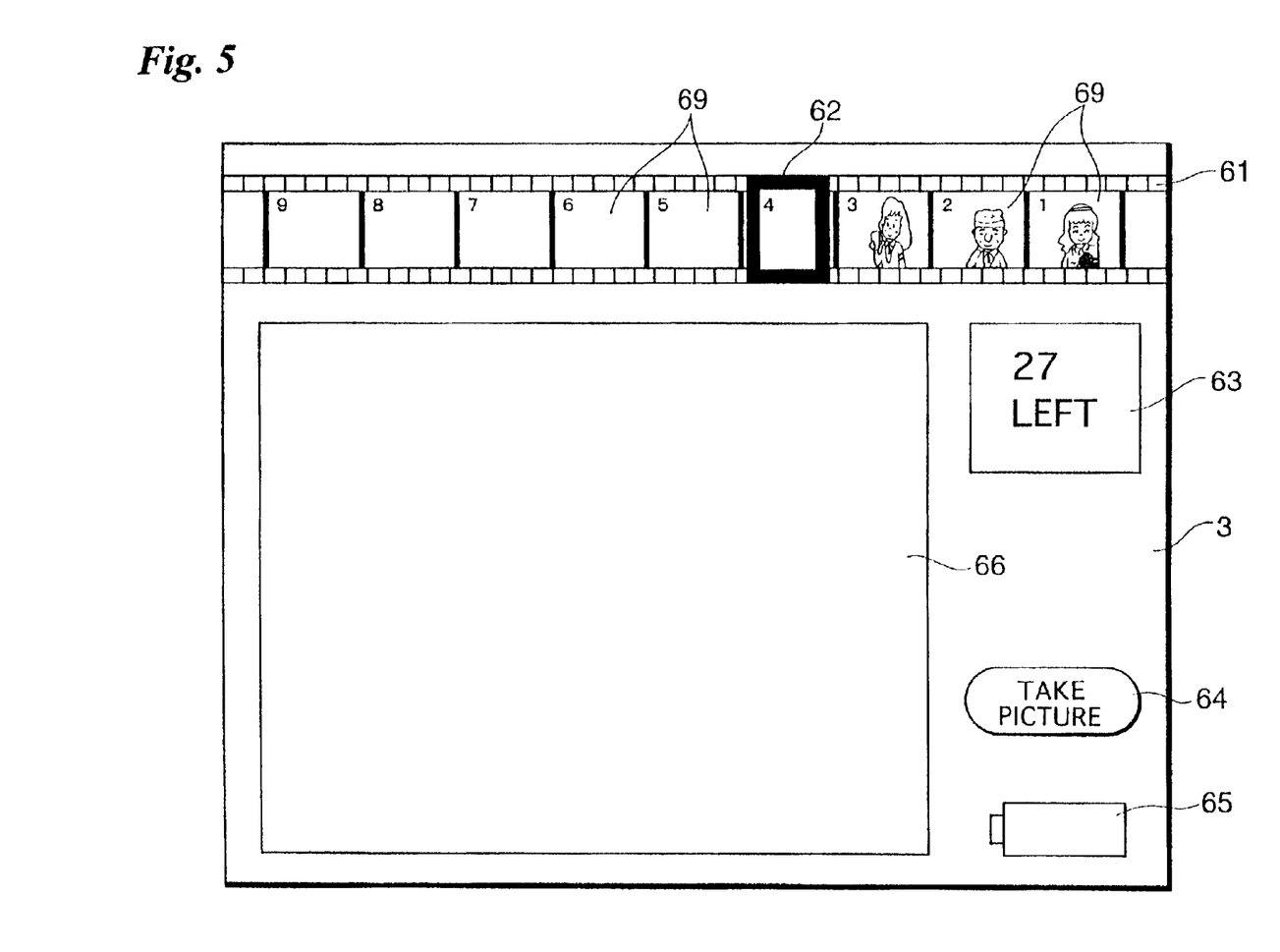
FIG. 5 illustrates an example of images displayed on a liquid crystal display screen.

FIG. 5 shows an example of images displayed on the liquid crystal display screen 3 of the digital still camera 1.

Film borders 61 mentioned above are displayed at the top of the liquid crystal display screen 3. The film borders 61 define a shape substantially the same as that of developed photographic film. The film borders 61 have a plurality of individual borders between them and the above-described thumbnail images are displayed within respective ones of the individual borders (referred to as thumbnail image borders 69) in the order of frame numbers. The frame numbers also are displayed at the top of the thumbnail images. It goes without saying that the frame numbers need not be displayed.

A designating frame 62 is displayed so as to enclose a prescribed thumbnail image border 69 within the film borders 61. Depending upon the direction in which the dial 4 is rotated, the designating frame 62 encloses the adjacent thumbnail image border 69 on the left or right of the thumbnail image border 69 currently enclosed.

An image display area 66 is formed over the entirety of the liquid crystal display screen 3 beneath the film borders 61. The image of a subject obtained by sensing the image or a main image corresponding to a thumbnail image enclosed by the designating frame 62 is displayed in the image display area 66.

An area 63 which displays the number of images remaining in the memory card 31 being displayed at the upper right of the image display area 66. A mode display area 64 is being displayed below the area 63. If the imaging mode has been set, the characters "TAKE PICTURE" are displayed in the mode display area 64. If the playback mode has been set, the characters "PLAYBACK" are displayed in the mode display area 64. Furthermore, an area 65 representing residual capacity of a chargeable battery in the form of battery length is being displayed below the mode display area 64. The length of displayed battery diminishes as the residual capacity of the chargeable battery is used up.

Figure 6:
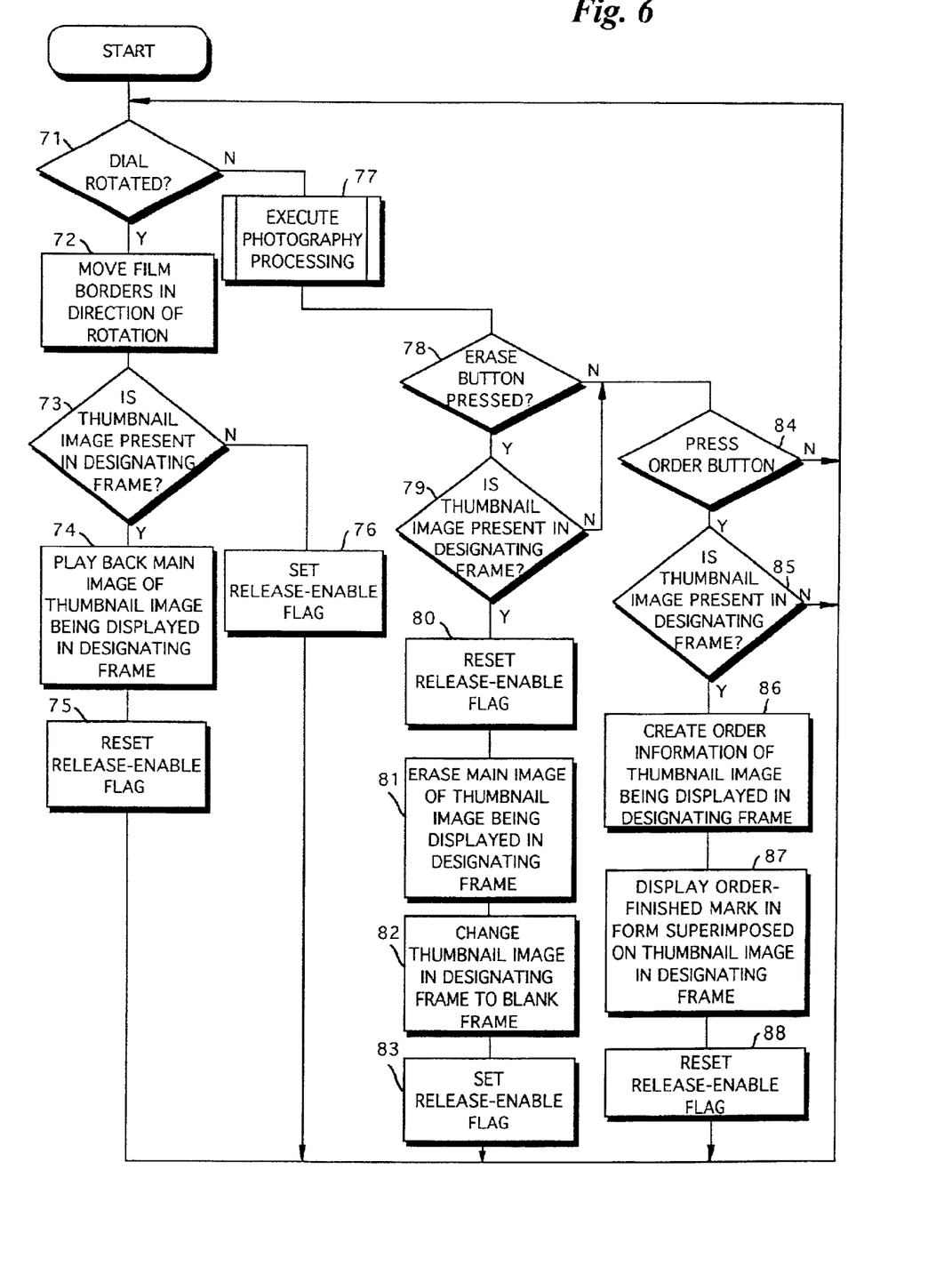
FIG. 6 is a flowchart illustrating processing executed by the digital still camera.
Figure 7:
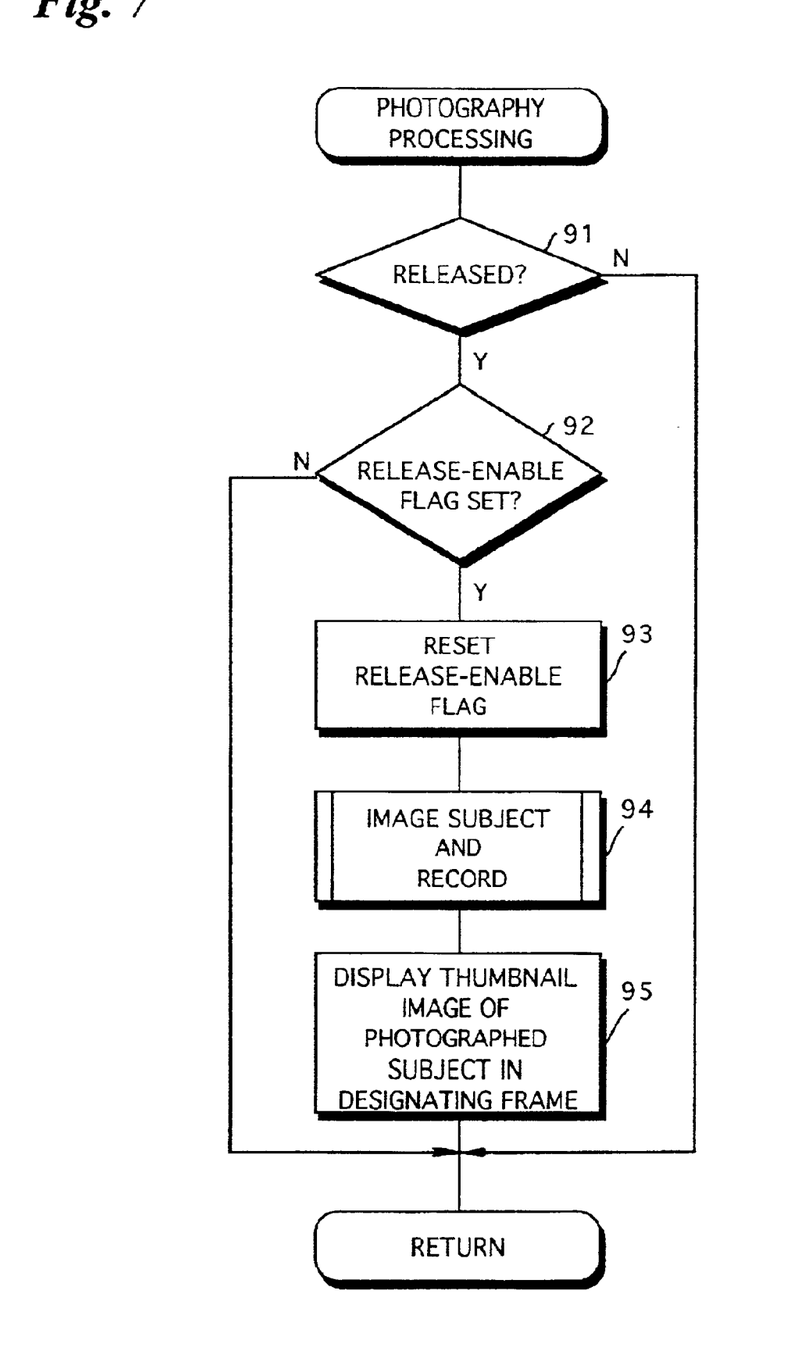
FIG. 7 is a flowchart illustrating photography processing.

FIG. 6 is a flowchart illustrating processing such as image sensing in the digital still camera 1, FIG. 7 shows a subroutine of the flowchart of FIG. 6, and FIGS. 8 to 13 illustrate examples of images displayed in the liquid crystal display screen 3.

If the dial 4 is rotated ("YES" at step 71), the entirety of the film borders 61 is moved by one frame of the thumbnail image border 69 in the direction of rotation (step 72). That is, the designating frame 62 does not move. It goes without saying that an arrangement may be adopted in which the film borders 61 are held fixed and the designating frame 62 is moved in accordance with rotation of the dial 4.

It is determined whether a thumbnail image is present in the designating frame 62 as a result of movement of the film borders 61 in accordance with rotation of the dial 4. If a thumbnail image is present in the designating frame 62 ("YES" at step 73), main image data representing the main image corresponding to the thumbnail image enclosed by the designating frame 62 is read from the memory card 31 (playback mode). The main image represented by the main image data that has been read is displayed in the image display area 66 (step 74). A release-enable flag is reset in order to inhibit overwriting of the image data being played back (step 75).

When a thumbnail image is not present in the designating frame 62 ("NO" at step 73), a decision is rendered to the effect that main image data corresponding to the frame number within the thumbnail image border enclosed by the designating frame 62 has not be recorded on the memory card 31 (imaging mode). The release-enable flag is set to allow depression of the shutter-release button 2 so that main image data can be recorded on the memory card 31 in association with this frame number (step 76).

Figure 8:
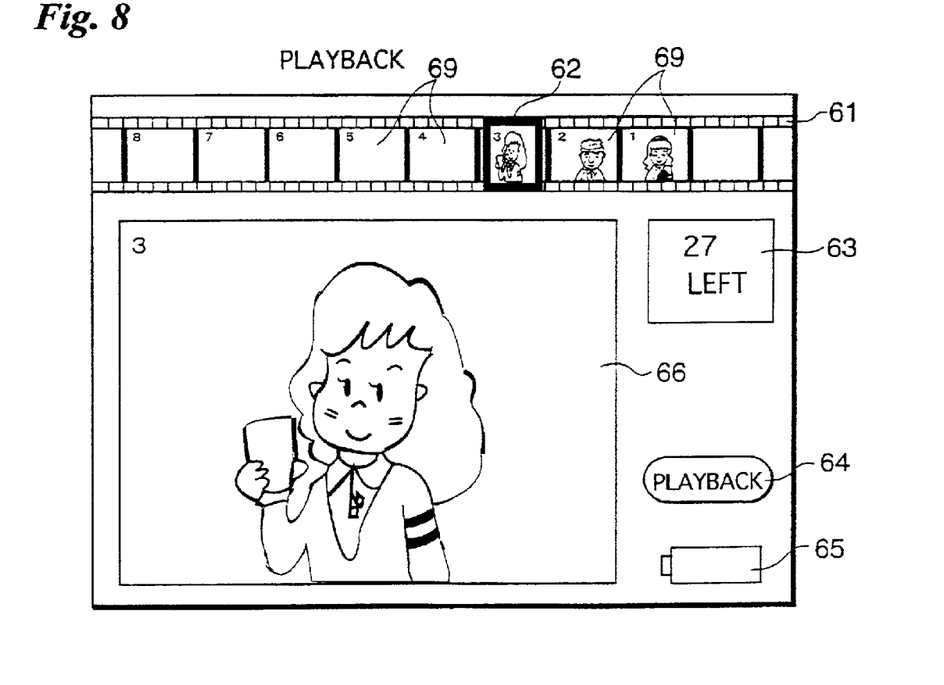
FIGS. 8 to 13 show examples of images displayed on the liquid crystal display screen.

If the power supply of the digital still camera 1 is turned on in the manner described above, an image of the kind shown in FIG. 5 is displayed on the liquid crystal display screen 3. If the dial 4 is rotated leftward under these conditions, the entirety of the film borders 61 is moved leftward by one frame of the thumbnail image border 69, whereupon an image shown in FIG. 8 is displayed on the liquid crystal display screen 3.

When the film borders 61 are moved to the left, the designating frame 62, which had been enclosing a blank image having the fourth frame number, encloses a thumbnail image having the third frame number, whereupon image data representing the main image corresponding to the thumbnail image having the third frame number is read from the memory card 31. The main image having the third frame number thus is displayed in the image display area 66. In addition, the characters "PLAYBACK" are displayed in the mode display area 64 so that the user can tell that the playback mode is in effect.

If the dial 4 is not rotated, predetermined photography processing is executed in response to depression of the shutter-release button 2 as necessary (step 77).

FIG. 7 is a flowchart illustrating photography processing.

If the shutter-release button 2 is pressed ("YES" at step 91), it is determined whether the release-enable flag corresponding to the frame number of a thumbnail image or blank image being enclosed by the designating frame 62 has been set (step 92).

If the release-enable flag has been set ("YES" at step 92), it can be considered that the designating frame 62 is enclosing a blank image. Thus it can be ascertained that main image data having the frame number corresponding to this blank image has not been recorded on the memory card 31. As a consequence, it becomes possible to record main image data having the frame number that corresponds to this blank image. When main image data has been recorded, other main image data cannot be recorded at a frame number identical with that of the recorded main image data. To achieve this, the release-enable flag is reset in advance in association with the frame number corresponding to the recording of the main image data (step 93).

A subject is subsequently imaged and image data representing the image of this subject is recorded on the memory card 31 as main image data (step 94). Thumbnail image data is generated from the main image data recorded on the memory card 31 and a thumbnail image represented by this thumbnail image data is displayed in the thumbnail image border 69 enclosed by the designating frame 62 (step 95). The main image represented by the main image data is displayed in the image display area 66.

Figure 9:
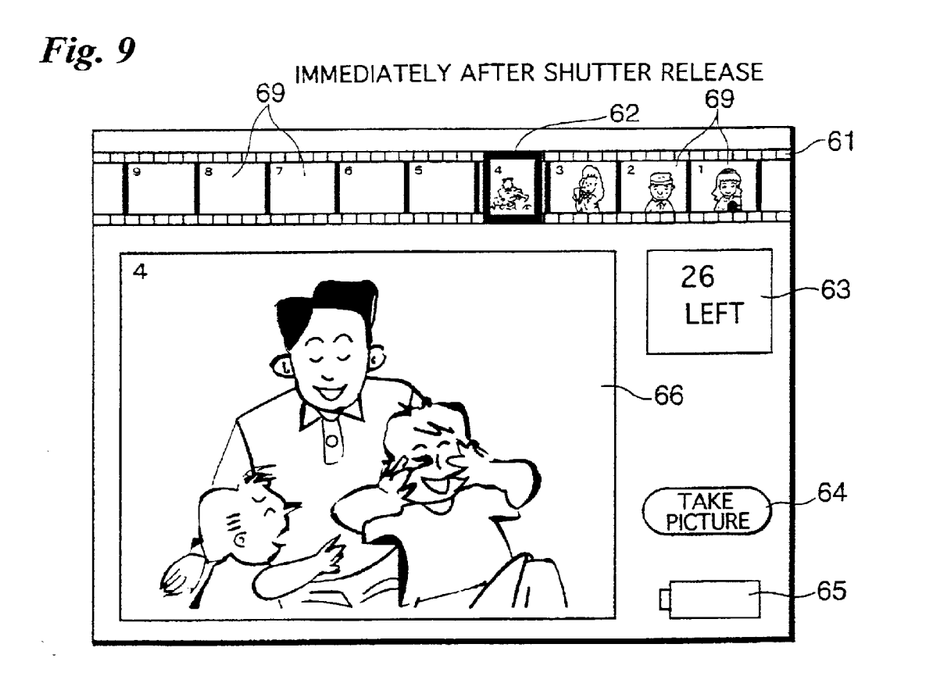
Figure 10:
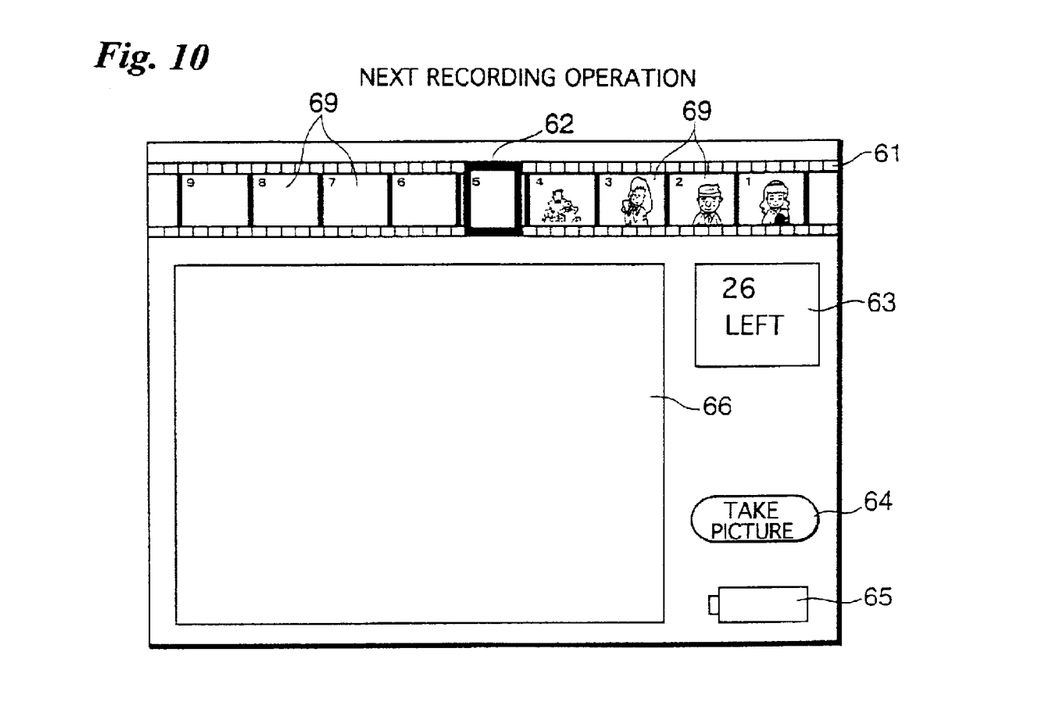

By way of example, if the shutter-release button 2 is pressed when the liquid crystal display screen 3 is in the state shown in FIG. 5, the liquid crystal display screen becomes as shown in FIG. 9. A thumbnail image of the main image obtained by imaging is displayed in the designating frame 62 and the main image is displayed in the image display area 66. Further, the number of images that can be recorded on the memory card 31 is reduced by one owing to the recording of the main image data and therefore the remaining-image count display in the area 63 which displays the number of images remaining in the memory card is decremented.

When the next main image is to be recorded, the dial 4 is rotated to the left. As a result, the designating frame 62 encloses the blank image having the fifth frame number. Thus, main image data can be recorded on the memory card 31 as a main image corresponding to the fifth frame number.

With reference again to FIG. 6, it is determined whether a thumbnail image is present in the designating frame 62 (step 79) if the erase button 5 is pressed by the user ("YES" at step 78). If a thumbnail image is present in the designating frame 62 ("YES" at step 79), this means that main image data corresponding to this thumbnail image has been recorded on the memory card 31. The release-enable flag is reset (step 80). Main image data corresponding to the thumbnail image enclosed by the designating frame 62 is erased from the memory card 31 in accordance with an erase command (step 81).

Furthermore, the thumbnail image corresponding to the erased main image is erased from the thumbnail image border 69. As a result, the interior of the thumbnail image border 69 enclosed by the designating frame 62 becomes a blank frame (step 82). Owing to erasure of the main image data, new main image data can be recorded in correspondence with the frame number of the erased main image data and therefore the release-enable flag is set in correspondence with this frame number (step 83).

Figure 11:
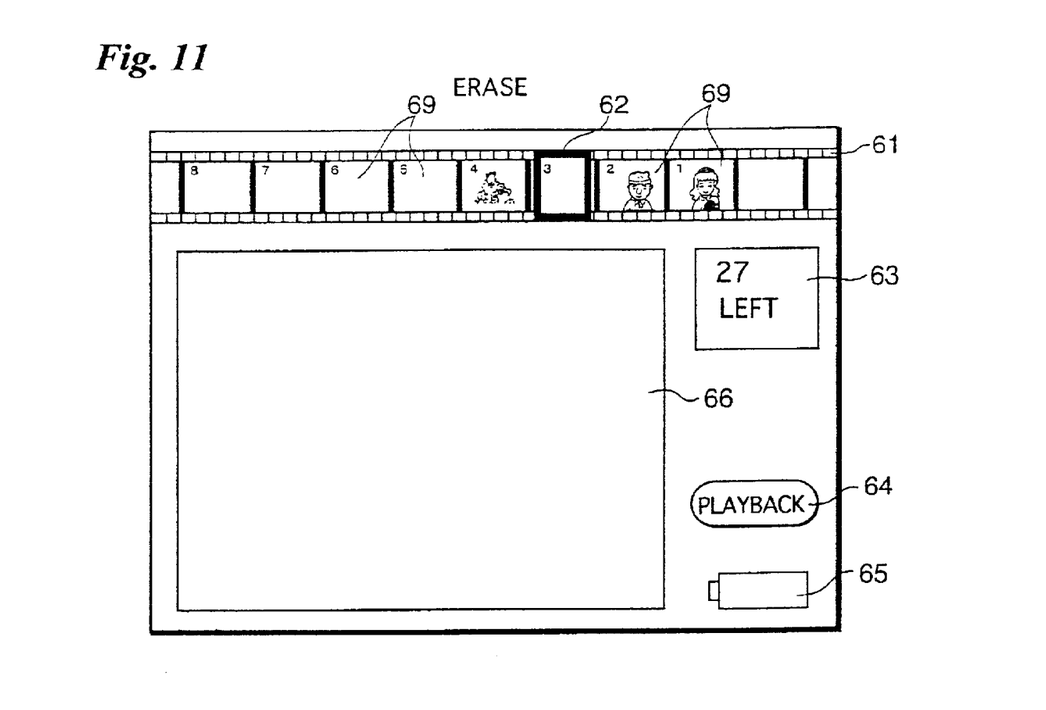

For example, assume that when the image shown in FIG. 9 is being displayed on the liquid crystal display screen 3, the thumbnail image of Frame No. 3 is enclosed by the designating frame 62 and the erase button 5 is pressed. When this is done, the thumbnail image within the thumbnail image border 69 enclosed by the designating frame 62 is erased, as shown in FIG. 11. Further, a main image having a frame number is not displayed in the image display area 66.

If the order button 6 is pressed ("YES" at step 84), it is determined whether a thumbnail image is present in the thumbnail image border 69 enclosed by the designating frame 62 (step 85). If a thumbnail image is present in the thumbnail image border 69 ("YES" at step 85), it is considered that a print order command for the main image that corresponds to this thumbnail image has been issued. Order information is generated (step 86) assuming that one is the number of ordered prints of the main image that corresponds to the thumbnail image enclosed by the designating frame. The number of ordered prints is incremented by pressing the order button 6 further. If the order button 6 is pressed twice within a fixed period of time, the order information is reset. It goes without saying that an arrangement may be adopted in which the digital still camera 1 is provided with an order-cancel button.

The generated order information is recorded, in association with the frame number, in the order-data recording area of the memory card 31, as mentioned earlier. Furthermore, a mark indicating that an order has been made is displayed on the corresponding thumbnail image (step 87). Further, the release-enable flag is reset in order to inhibit overwriting of image data presently being reproduced for ordering (step 88).

Figure 12:
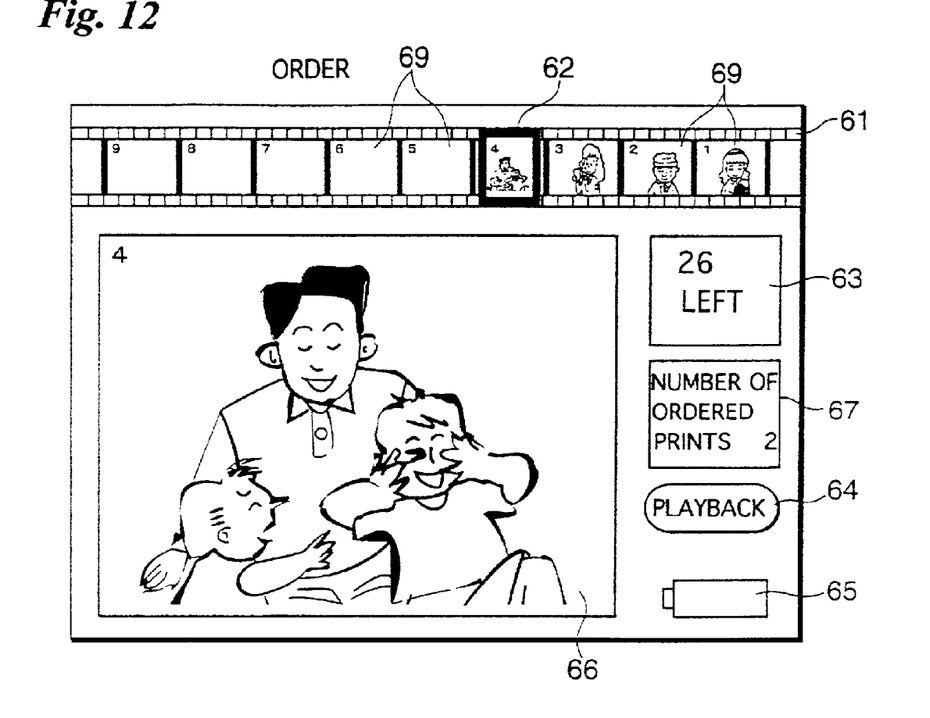
Figure 13:
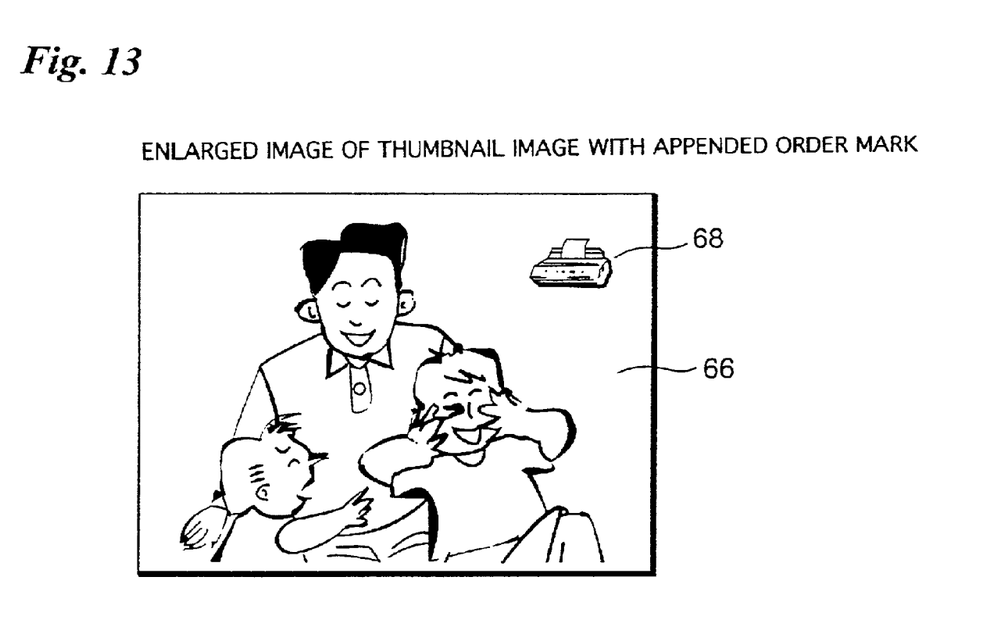

By way of example, assume that the image shown in FIG. 12 is being displayed on the liquid crystal display screen 3. If the order button 6 is pressed under these circumstances, an order command for ordering the fourth frame number is issued. If the order button is pressed, an area 67 for displaying the number of prints ordered appears at the right of the image display area 66. The number of ordered prints, which conforms to depression of the order button 6, is displayed in the area 67. Furthermore, a printer mark 68 indicating that an order has been made is displayed on the thumbnail image corresponding to the main image that has been ordered, as illustrated in FIG. 13. By observing the printer mark 68, the user can ascertain that the main image corresponding to this thumbnail image has been ordered for printing. Preferably, the number of prints ordered also would be displayed on the thumbnail image. This would allow the user not only to ascertain that an order has been made but also to check the number of prints ordered.

When image data and order information have thus been recorded on the memory card 31, the user takes the memory card 31 to a photo lab. The latter reads the image data from the memory card 31 and prints main images in accordance with the order information.

When the memory card 31 is delivered to the photo lab and the main images are printed, this memory card is replaced at the photo lab by a new memory card whose chargeable battery 32 has been charged. The user need not charge the chargeable battery 32 and need not exchange one chargeable battery 32 for another.

As many apparently widely different embodiments of the present invention can be made without departing from the spirit and scope thereof, it is to be understood that the invention is not limited to the specific embodiments thereof except as defined in the appended claims.

What is claimed is:

1. A digital camera comprising:

a lever capable of being rotated through a prescribed angle;

a mode setting unit for setting an imaging mode or a playback mode in accordance with rotation of said lever;

an imaging unit for sensing the image of a subject in response to setting of the imaging mode by said mode setting unit and outputting image data representing the image of the subject;

a first display controller for controlling a display unit so as to display the image of the subject represented by the image data output from said image sensing unit;

a playback-frame decision unit for deciding a playback frame in accordance with rotation of the lever if the playback mode has been set by said mode setting unit;

a playback unit for reading image data of the playback frame, which has been decided by said playback-frame decision unit, from a recording medium and subjecting the image data to playback processing;

a second display controller for controlling the display unit so as to display an image represented by image data that has been reproduced by said playback unit;

a reading unit for reading image data that has been recorded on the recording medium;

a third display controller for controlling the display unit so as to display a thumbnail image of an image represented by the image data read by said reading unit;

a fourth display controller for controlling the display unit so as to display an image of a blank frame when image data can be recorded on the recording medium; and a designating unit for designating the thumbnail image or the image of the blank frame in accordance with rotation of the lever;

wherein said mode setting unit is set to the playback mode in response to designation of the thumbnail image by said designating unit and is set to the imaging mode in response to designation of the image of the blank frame by said designating unit.

2. The camera according to claim 1, wherein said playback-frame decision unit decides on a thumbnail image, which has been designated by said designating unit, as the image of a playback frame.

3. The camera according to claim 1, wherein said third display controller displays the thumbnail images on the display unit in the order of frame number.

4. The camera according to claim 1, further comprising:

an erase button for applying an erase command;

a first designating unit for designating one frame among thumbnail images of a plurality of frames in accordance with rotation of said lever; and an erase controller for erasing image data, which represents the image of the frame designated by said first designating unit, from the recording medium.

5. The camera according to claim 4, further comprising a fifth display controller for displaying a thumbnail image, which corresponds to image data that has been erased by said erase controller, in a display of a blank frame.

6. The camera according to claim 1, further comprising:

an order button for applying an order command;

a second designating unit for designating one frame among the thumbnail images of the plurality of frames in accordance with rotation of the lever; and a recording controller for recording order information, which concerns a frame that has been designated by said second designating unit, on the recording medium in response to depression of said order button.

7. A method of controlling operation of a digital still camera comprising:

setting an imaging mode or a playback mode in accordance with rotation of a lever capable of being rotated through a prescribed angle;

sensing the image of a subject in response to setting of the imaging mode and obtaining image data representing the image of the subject;

displaying the image of the subject represented by the image data obtained;

deciding a playback frame in accordance with rotation of the lever if the playback mode has been set;

reading image data of the decided playback frame from a recording medium;

displaying an image represented by image data that has been read;

reading image data that has been recorded on the recording medium, by a reading unit;

displaying a thumbnail image of an image represented by the image data read by said reading unit;

displaying an image of a blank frame when image data is recorded on the recording medium; and designating the thumbnail image or the image of the blank frame in accordance with rotation of a lever capable of being rotated through a prescribed angle, wherein playback mode is set when designating the thumbnail image, and image mode is set when designating the image of the blank frame.

* * * * *

UNITED STATES PATENT AND TRADEMARK OFFICE
CERTIFICATE OF CORRECTION

PATENT NO.    : 6,943,841 B2
DATED         : November 21, 2001
INVENTOR(S)   : Izumi Miyake et al.

It is certified that error appears in the above-identified patent and that said Letters Patent is hereby corrected as shown below:

<u>Title page,</u>
Please add Item -- [54] DIGITAL CAMERA HAVING DISPLAY CONTROLLERS AND DESIGNATING UNIT AND METHOD OF CONTROLLING OPERATION --.

Signed and Sealed this

Eighteenth Day of October, 2005

JON W. DUDAS
*Director of the United States Patent and Trademark Office*